(12) United States Patent
Scholz et al.

(10) Patent No.: US 12,044,427 B2
(45) Date of Patent: Jul. 23, 2024

(54) METHOD AND SYSTEM FOR BALANCING A HYDRONIC NETWORK

(71) Applicant: BELIMO HOLDING AG, Hinwil (CH)

(72) Inventors: Volkher Scholz, Zürich (CH); Stefan Mischler, Wald (CH); Forest Reider, Seegraeben (CH); Marc Thuillard, Uetikon am See (CH)

(73) Assignee: BELIMO HOLDING AG, Hinwil (CH)

( * ) Notice: Subject to any disclaimer, the term of this patent is extended or adjusted under 35 U.S.C. 154(b) by 404 days.

(21) Appl. No.: 17/607,508

(22) PCT Filed: May 26, 2020

(86) PCT No.: PCT/EP2020/064545
§ 371 (c)(1),
(2) Date: Oct. 29, 2021

(87) PCT Pub. No.: WO2021/013406
PCT Pub. Date: Jan. 28, 2021

(65) Prior Publication Data
US 2022/0196250 A1 Jun. 23, 2022

(30) Foreign Application Priority Data
Jul. 22, 2019 (CH) ..................... 00928/19

(51) Int. Cl.
*F24F 11/84* (2018.01)
*G05B 15/02* (2006.01)

(52) U.S. Cl.
CPC .............. *F24F 11/84* (2018.01); *G05B 15/02* (2013.01); *F24D 2220/0264* (2013.01); *F24D 2220/0292* (2013.01); *F24D 2220/044* (2013.01)

(58) Field of Classification Search
CPC ....... Y10T 137/7759; F24D 2220/0264; F24D 2220/0292; F24D 2220/044; G05B 15/02; F24F 11/84
See application file for complete search history.

(56) References Cited

U.S. PATENT DOCUMENTS 5,325,884 A * 7/1994 Mirel ................. G05D 16/2066
137/486
8,024,161 B2 9/2011 Pekar et al.
(Continued)

FOREIGN PATENT DOCUMENTS

CN 103017253 A 4/2013
CN 104995458 A 10/2015
(Continued)

OTHER PUBLICATIONS

Swiss Search Report for 9282019, dated Nov. 15, 2019.
(Continued)

*Primary Examiner* — Jessica Cahill
(74) *Attorney, Agent, or Firm* — Sughrue Mion, PLLC

(57) ABSTRACT

For balancing a hydronic network that comprises a plurality of parallel zones with a regulating valve in each zone, individual flow characteristics are determined (S1) for each of the regulating valves, by recording the total flow of fluid measured at different valve positions of a respective regulating valve, while the remaining other regulating valves are set to a closed valve position. Dependent flow characteristics are determined (S2) by recording the total flow of fluid measured at different valve positions of the respective regulating valve, while the remaining other regulating valves are set to an open valve position. Correction factors are determined (S3) for each of the regulating valves, using the individual flow characteristics and the dependent flow characteristics. The hydronic network is balanced (S4) by (Continued)

setting the valve positions of the regulating valves using target flows and the correction factors.

21 Claims, 6 Drawing Sheets

(56) References Cited

U.S. PATENT DOCUMENTS

| | | | |
|---|---|---|---|
| 9,864,383 B2* | 1/2018 | Reider | G05D 7/0641 |
| 10,132,508 B2 | 11/2018 | Frilev et al. | |
| 10,268,212 B2 | 4/2019 | Schmidlin et al. | |
| 10,697,649 B2 | 6/2020 | Bergqvist et al. | |
| 10,890,351 B2 | 1/2021 | Reider et al. | |
| 11,365,891 B2 | 6/2022 | Kallesoe et al. | |
| 2010/0049480 A1* | 2/2010 | Pekar | F24D 19/1015 703/2 |
| 2010/0147394 A1* | 6/2010 | Trnka | F24D 19/1036 137/12 |
| 2013/0048114 A1* | 2/2013 | Rothman | G05B 15/02 137/551 |
| 2014/0150883 A1* | 6/2014 | Lederle | G05D 7/0617 137/486 |
| 2015/0066222 A1 | 3/2015 | Martinez et al. | |
| 2015/0316935 A1* | 11/2015 | Schmidlin | F24D 19/1015 700/282 |
| 2017/0272844 A1 | 9/2017 | Bergqvist et al. | |
| 2017/0328367 A1 | 11/2017 | Frilev et al. | |
| 2017/0328579 A1 | 11/2017 | Kallesoe et al. | |
| 2019/0264947 A1 | 8/2019 | Reider et al. | |

FOREIGN PATENT DOCUMENTS

| | | |
|---|---|---|
| CN | 205878298 U | 1/2017 |
| CN | 106969409 A | 7/2017 |
| CN | 107003014 A | 8/2017 |
| CN | 206669841 U | 11/2017 |
| CN | 107820556 A | 3/2018 |
| CN | 207394967 U | 5/2018 |
| CN | 109477644 A | 3/2019 |
| DE | 199 12 588 A1 | 9/2000 |
| DE | 697 06 458 T2 | 4/2002 |
| DE | 10 2008 003 315 A1 | 7/2009 |
| DE | 10 2015 121 418 B3 | 3/2017 |
| EP | 0 795 724 A1 | 9/1997 |
| EP | 2 085 707 A2 | 8/2009 |
| EP | 2 157 376 A2 | 2/2010 |
| EP | 2 226 575 A2 | 9/2010 |
| EP | 2 728 269 A1 | 5/2014 |
| EP | 3 168 541 B1 | 11/2016 |
| FR | 2 870 927 A1 | 12/2005 |
| WO | 2013/000785 A2 | 1/2013 |
| WO | 2014/094991 A1 | 6/2014 |
| WO | 2018/095609 A2 | 5/2018 |

OTHER PUBLICATIONS

International Search Report for PCT/EP2020/064545 dated, Aug. 25, 2020 (PCT/ISA/210).

Written Opinion of the International Searching Authority for PCT/EP2020/064545 dated, Aug. 25, 2020 (PCT/ISA/237).

Chinese Office Action dated Sep. 28, 2023 in Application No. 202080052494.1.

* cited by examiner

METHOD AND SYSTEM FOR BALANCING A HYDRONIC NETWORK

CROSS REFERENCE TO RELATED APPLICATIONS

This application is a National Stage of International Application No. PCT/EP2020/064545 filed May 26, 2020, claiming priority based on Swiss Patent Application No. 00928/19 filed Jul. 22, 2019.

FIELD OF THE INVENTION

The present invention relates to a method and a computer system for balancing a hydronic network. Specifically, the present invention relates to a method and a computer system for balancing a hydronic network that comprises a plurality of parallel zones with a regulating valve in each zone for regulating a flow of fluid through the respective zone.

BACKGROUND OF THE INVENTION

Hydronic networks typically comprise multiple consumers, e.g. thermal energy exchangers, arranged in parallel zones, meaning parallel branches or lines, through which a liquid fluid is transported for distributing thermal energy for the purpose of heating or cooling. The zones and consumers typically have different designs and configurations, meaning that they have different diameters and/or lengths of the transport lines—for example, pipe conduits—and have different and/or varying flow volumes and/or throughput. In order to undertake a balanced and/or compensated distribution of the fluids to the consumers in such fluid transport systems, the consumers or zones are each configured with a compensation- or balancing organ, for example a regulating valve with a motorized actuator, which sets the flow through the respective consumer at different degrees of opening and/or valve positions.

A balancing method for a network for the distribution of a non-compressed liquid is described in DE 69706458, wherein for each branch, two pressure connection points are arranged on both sides of the compensating organ, and a further third pressure connection point is arranged at a distance therefrom. In all branches, flow measurements are carried out by measuring the difference in flow on both sides of the respective compensating organ, and a measurement of a pressure difference is carried out by means of the third pressure connection point. On the basis of these measured values, the hydraulic flow capacity coefficients of all branches and segments on the primary line are calculated. Finally, the adjustment positions of each compensating organ are calculated and set on the basis of knowledge of the desired flow in each branch and utilizing the specific flow capacity coefficients. The compensation method requires multiple pressure connection points for each compensating organ, and is not designed for a dynamic balancing of a fluid transport system.

EP 2 085 707 shows the hydraulic balancing of a heating system, wherein a heating element is equipped with a measuring device for measurement of the pressure and flow volume. Means are included for the detection of the flow volume as provided, as are means for detecting the pressure difference between the in-flow and the outlet flow. Means for the detection of the flow volume are arranged on the heating element, and serve the purpose of eliminating errors and automating the balancing. EP 0 795 724, which is in the same patent family as DE 69706458, shows substantially the same features as DE 69706458.

DE 199 12 588 shows a hydraulic system having multiple conduit lines. For the purpose of improving the regulating behavior, valves with an electronic flow volume measuring device and an actuator drive are arranged in both a primary circuit and in the conduit lines of the consumer circuits.

EP 2 157 376 shows an arrangement for hydraulically balancing a system for the purpose of cooling or heating. The system has an in-flow line, an outlet flow line, a throttle device, and a measuring device for a flow volume. Valves are included in each line for the purpose of hydraulic balancing, and measuring means are included for the purpose of determining the flows into the individual lines.

U.S. Pat. No. 8,024,161 describes a method and system for optimal model-based multivariable balancing for distributed hydraulic networks based on global differential pressure/flow rate information. U.S. Pat. No. 8,024,161 uses a simplified mathematical model of a hydraulic network and a set of measured flow values in all the zones of the hydraulic network to identify unknown network parameters. According to U.S. Pat. No. 8,024,161, valve settings are balanced by calculating the sum of pressure drops across the balancing valves and by solving an optimization problem to minimize the sum of pressure drops across the balancing valves in a non-iterative approach.

In the prior art systems described above, a separate sensor is included in each consumer for the purpose of determining the flow. As a result, a great degree of complexity is particularly inherent in the installation process.

WO 2014/094991, in the name of the applicant, describes a method for balancing a hydronic network that comprises a plurality of consumers arranged in parallel zones with regulating 20 valves in each zone for regulating the flow of fluid through the respective zone. One common (shared) flow sensor is used to measure the total flow of fluid through the plurality of parallel zones. For each of the regulating valves, individual flow characteristics are recorded which indicate for a respective regulating valve the total flow of fluid measured by the common flow sensor at different valve positions of the respective regulating valve, while the remaining other regulating valves of the hydronic network are set to a closed valve position. According to WO 2014/094991 a balancing factor is calculated based on the measured current total flow and the sum of the desired target flows through the consumers. Dynamic balancing of the hydronic network or its consumers, respectively, is implemented by setting the valve position of the regulating valves based on the characteristic data and the target flows scaled using the balancing factor. The balancing method disclosed in WO 2014/094991 performs well in configurations where the settings of the regulating valves in the parallel zones do not significantly influence each other.

SUMMARY OF THE INVENTION

It is an object of this invention to provide a method and a computer system for balancing a multi-zone hydronic network, which method and computer system do not have at least some of the disadvantages of the prior art. In particular, it is an object of the present invention to provide a method and a computer system for balancing a hydronic network with parallel zones, such that mutual influences of the parallel zones are considered in balancing the hydronic network.

According to the present invention, these objects are achieved through the features of the independent claims. In addition, further advantageous embodiments follow from the dependent claims and the description.

A multi-zone hydronic network comprises a plurality of parallel zones with a regulating valve in each zone for regulating a flow of fluid through the respective zone.

According to the present invention, the above-mentioned objects are particularly achieved in that for balancing the hydronic network, one flow sensor is used to measure a total flow of fluid through the plurality of parallel zones of the hydronic network. For each of the regulating valves, individual flow characteristics are recorded in a computer. The individual flow characteristics indicate for a respective regulating valve the total flow of fluid measured by the flow sensor at different valve positions of the respective regulating valve, while the remaining other regulating valves of the hydronic network are set to a closed valve position. Further, for each of the regulating valves, combined flow characteristics are recorded in the computer. The combined flow characteristics indicate for the respective regulating valve the total flow of fluid measured by the flow sensor at different valve positions of the respective regulating valve, while the remaining other regulating valves of the hydronic network are set to an open valve position. The computer determines correction factors for each of the regulating valves, using the individual flow characteristics of the respective regulating valve and the combined flow characteristics of the respective regulating valve. The computer balances the hydronic network by setting the valve positions of the regulating valves using target flows for the zones and the correction factors of the regulating valves.

In an embodiment, the computer balances the hydronic network by determining individual valve positions for the regulating valves, using the target flows for the zones and the individual flow characteristics of the regulating valves, and determining the correction factors for each of the regulating valves further using the individual valve positions of the regulating valves.

In an embodiment, the computer balances the hydronic network by performing an iteration process which includes determining in a first step correction factors for the regulating valves, using individual valve positions for the regulating valves, determining in a second step corrected valve positions for the regulating valves, using the target flows for the zones and the correction factors of the regulating valves, and repeating the first step and the second step, using the corrected valve positions from the second step as the individual valve positions in the first step.

In an embodiment, the computer uses the corrected valve positions for determining whether an iteration end point is reached, prior to the repeating of the first step and the second step.

In an embodiment, the computer records the combined flow characteristics by recording for each of the regulating valves the total flow of fluid measured by the flow sensor at different valve positions of the respective regulating valve and at various valve positions of the remaining other regulating valves of the hydronic network, in a range from closed valve position to fully open valve position; and the computer determines the correction factors for each of the regulating valves for a plurality of different valve positions of the regulating valves of the hydronic network.

In an embodiment, the computer records for each of the regulating valves a complementary flow of fluid. The complementary flow of fluid indicates for the respective regulating valve the total flow of fluid measured by the flow sensor at a closed valve position of the respective regulating valve, while the remaining other regulating valves of the hydronic network are set to the open valve position. The computer determines the correction factors using the complementary flow of fluid of the respective regulating valve and the combined flow characteristics of the respective regulating valve.

In an embodiment, the computer computes dependent flow characteristics for each of the regulating valves, using the combined flow characteristics of the respective regulating valve and the total flow of fluid measured by the flow sensor at a closed valve position of the respective regulating valve, while the remaining other regulating valves of the hydronic network are set to the open valve positions; and the computer determines the correction factors for each of the regulating valves by applying an objective function to the dependent flow characteristics of the respective regulating valve and the individual flow characteristics of the respective regulating valve.

In an embodiment, the computer determines the correction factors by calculating a mean valve position from the valve positions of the regulating valves, and determining the correction factor for the respective regulating valve of a particular zone using the mean valve position and a zone-specific dependency factor of the particular zone.

In an embodiment, a pressure sensor is used to measure a current system pressure of the hydronic network, and the computer scales the total flow of fluid measured by the flow sensor, using the current system pressure.

In an embodiment, one or more individual flow sensors are used to measure individual flows of fluid through respective regulating valves, and the computer uses the individual flows of fluid measured by the individual flow sensors for determining the individual flow characteristics of the respective regulating valves and the combined flow characteristics of the respective regulating valves.

In addition to a method of balancing a hydraulic network, the present invention also relates to a computer system for implementing and executing the method; specifically, a computer system for balancing the hydronic network, the computer system comprising a processor configured to: receive from a flow sensor of the hydronic network the total flow of fluid through the plurality of parallel zones; record for each of the regulating valves individual flow characteristics, the individual flow characteristics indicating for a respective regulating valve the total flow of fluid measured by the flow sensor at different valve positions of the respective regulating valve, while the remaining other regulating valves of the hydronic network are set to a closed valve position; record for each of the regulating valves combined 20 flow characteristics, the combined flow characteristics indicating for the respective regulating valve the total flow of fluid measured by the flow sensor at different valve positions of the respective regulating valve, while the remaining other regulating valves of the hydronic network are set to an open valve position; determine correction factors for each of the regulating valves, using the individual flow characteristics of the respective regulating valve and the combined flow characteristics of the respective regulating valve; and balance the hydronic network by setting the valve positions of the regulating valves using target flows for the zones and the correction factors of the regulating valves.

In an embodiment, the computer system or its processor, respectively, is configured to balance the hydronic network by determining individual valve positions for the regulating valves using the target flows for the zones and the individual flow characteristics of the regulating valves, and determining the correction factors for each of the regulating valves further using the individual valve positions of the regulating valves.

In an embodiment, the computer system or its processor, respectively, is configured to balance the hydronic network by performing an iteration process which includes determining in a first step correction factors for the regulating valves using individual valve positions for the regulating valves, determining in a second step corrected valve positions for the regulating valves, using the target flows for the zones and the correction factors of the regulating valves, and repeating the first step and the second step, using the corrected valve positions from the second step as the individual valve positions in the first step.

In an embodiment, the computer system or its processor, respectively, is configured to use the corrected valve positions for determining whether an iteration end point is reached, prior to the repeating of the first step and the second step.

In an embodiment, the computer system or its processor, respectively, is configured to record the combined flow characteristics by recording for each of the regulating valves the total flow of fluid measured by the flow sensor at different valve positions of the respective regulating valve and at various valve positions of the remaining other regulating valves of the hydronic network, in a range from closed valve position to fully open valve position; and determine the correction factors for each of the regulating valves for a plurality of different valve positions of the regulating valves of the hydronic network.

In an embodiment, the computer system or its processor, respectively, is configured to record for each of the regulating valves a complementary flow of fluid. The complementary flow of fluid indicates for the respective regulating valve the total flow of fluid measured by the flow sensor at a closed valve position of the respective regulating valve, while the remaining other regulating valves of the hydronic network are set to the open valve position. The computer is further configured to determine the correction factors using the complementary flow of fluid of the respective regulating valve and the combined flow characteristics of the respective regulating valve.

In an embodiment, the computer system or its processor, respectively, is configured to compute dependent flow characteristics for each of the regulating valves, using the combined flow characteristics of the respective regulating valve and the total flow of fluid measured by the flow sensor at a closed valve position of the respective regulating valve, while the remaining other regulating valves of the hydronic network are set to the open valve positions; and to determine the correction factors for each of the regulating valves by applying an objective function to the dependent flow characteristics of the respective regulating valve and the individual flow characteristics of the respective regulating valve.

In an embodiment, the computer system or its processor, respectively, is configured to determine the correction factors by calculating a mean valve position from the valve positions of the regulating valves of the hydronic network, and determining the correction factor for the respective regulating valve of a particular zone using the mean valve position and a zone-specific dependency factor of the particular zone.

In an embodiment, the computer system or its processor, respectively, is configured to receive from a pressure sensor a current system pressure of the hydronic network, and to scale the total flow of fluid measured by the flow sensor, using the current system pressure.

In an embodiment, the computer system or its processor, respectively, is configured to receive from one or more individual flow sensors individual flows of fluid through respective regulating valves, and to use the individual flows of fluid from the individual flow sensors for determining the individual flow characteristics of the respective regulating valves and the combined flow characteristics of the respective regulating valves.

In addition to a method and a computer system for balancing a multi-zone hydraulic network, the present invention also relates to a computer program product for controlling a computer to implement and execute the method; specifically, a computer program product comprising a non-transitory computer-readable medium having stored thereon computer program code configured to control one or more processors of a computer system for balancing the hydraulic network. The computer program code is configured to control the processors of the computer system such that the computer system receives from a flow sensor of the hydronic network the total flow of fluid through the plurality of parallel zones; records for each of the regulating valves individual flow characteristics, the individual flow characteristics indicating for a respective regulating valve the total flow of fluid measured by the flow sensor at different valve positions of the respective regulating valve, while the remaining other regulating valves of the hydronic network are set to a closed valve position; records for each of the regulating valves combined flow characteristics, the combined flow characteristics indicating for the respective regulating valve the total flow of fluid measured by the flow sensor at different valve positions of the respective regulating valve, while the remaining other regulating valves of the hydronic network are set to an open valve position; determines correction factors for each of the regulating valves, using the individual flow characteristics of the respective regulating valve and the combined flow characteristics of the respective regulating valve; and balances the hydronic network by setting the valve positions of the regulating valves using target flows for the zones and the correction factors of the regulating valves.

In further embodiments, the computer program code is configured to control the processors of the computer system such that the computer system implements further embodiments of the method described above.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
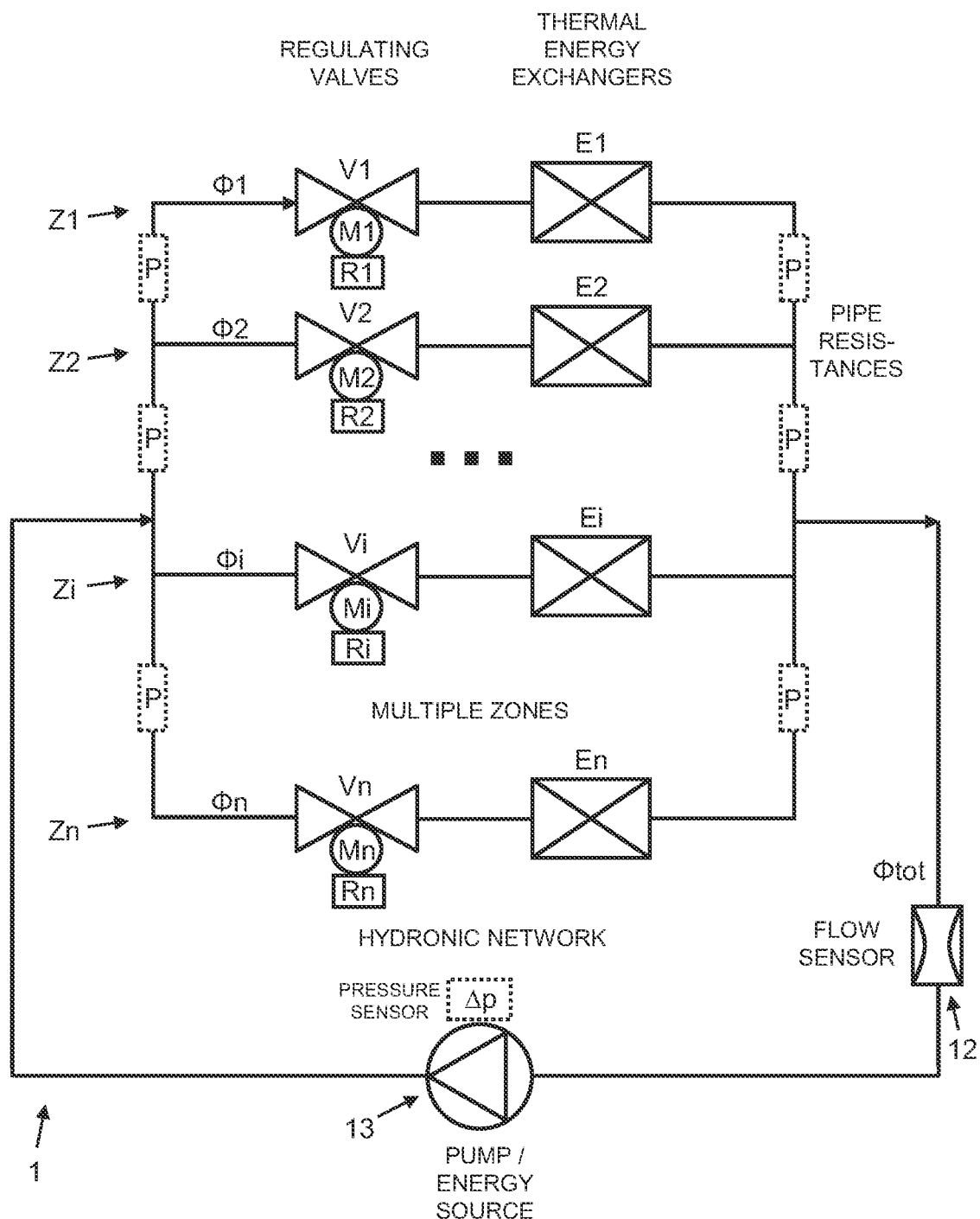
FIG. 1: shows a block diagram illustrating schematically an example of simple hydronic network, comprising multiple parallel zones with a regulating valve and a thermal energy exchanger in each zone.
Figure 2:
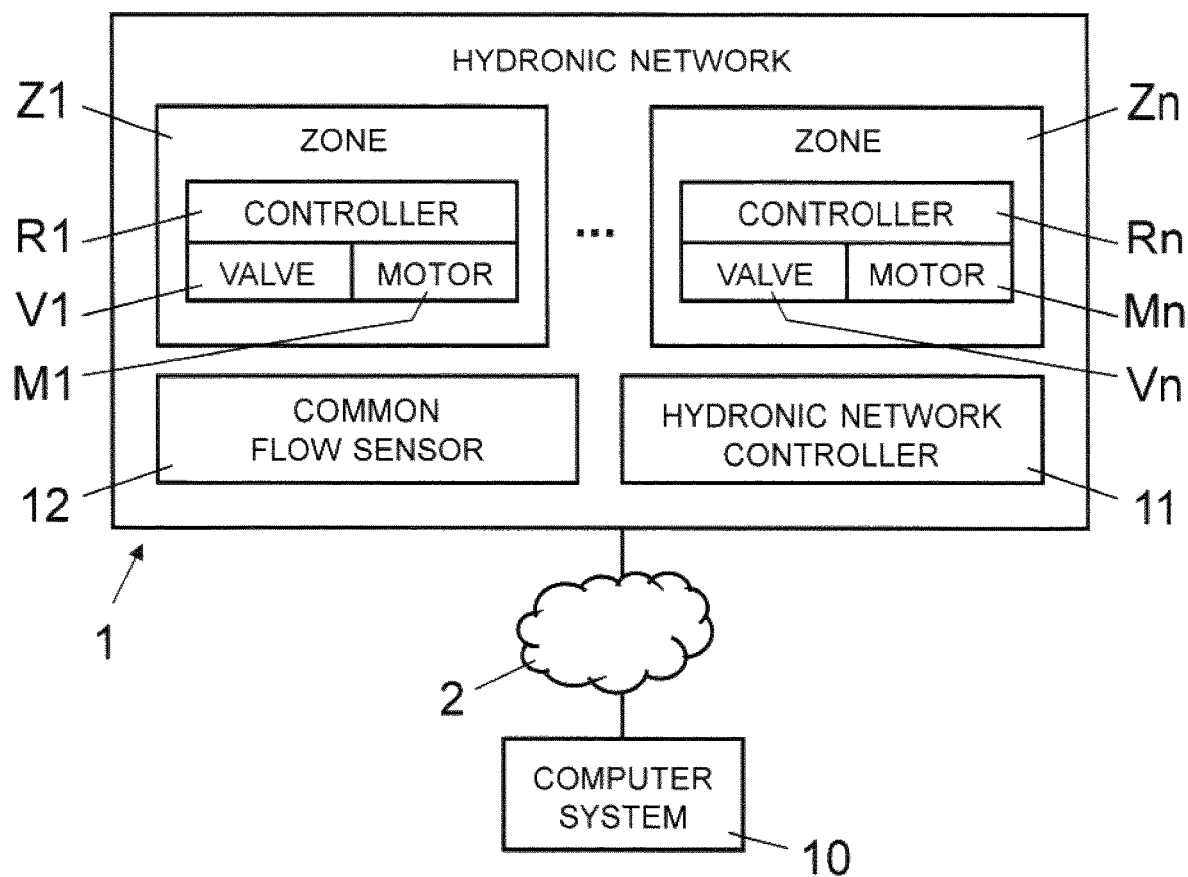
FIG. 2: shows a block diagram illustrating schematically an example of a hydronic network and a cloud-based computer system for balancing the hydronic network.
Figure 3:
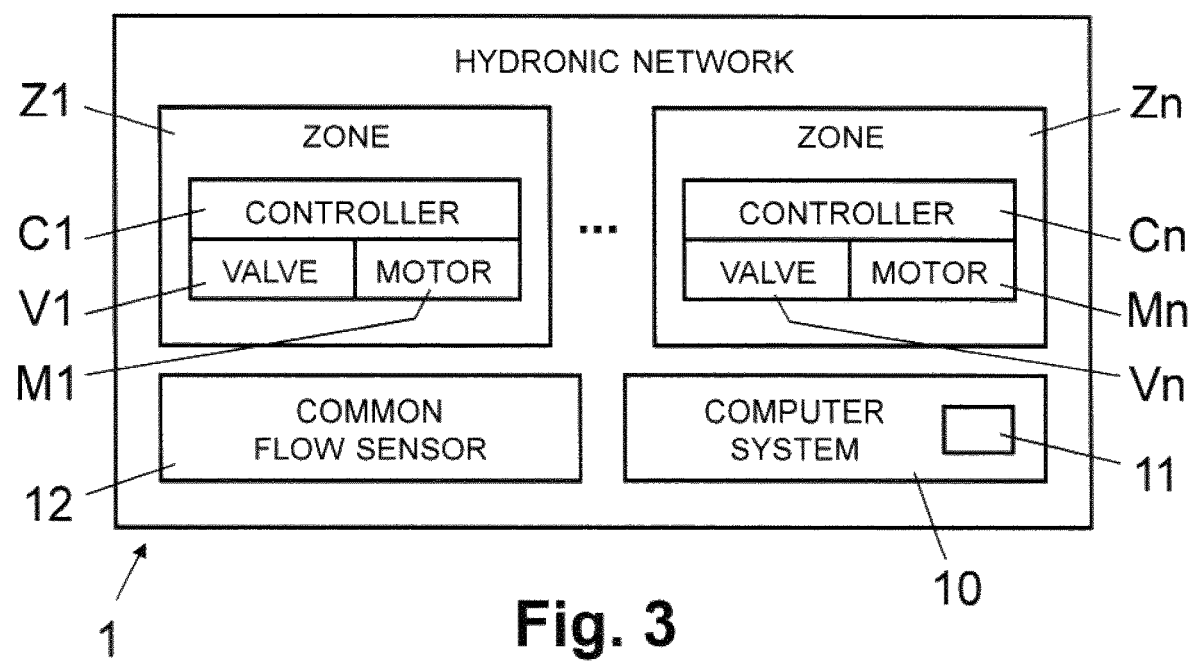
FIG. 3: shows a block diagram illustrating schematically an example of a hydronic network and a local computer system for balancing the hydronic network.

In FIGS. 1, 2, and 3, reference numeral 1 refers to a hydronic network that comprises a plurality of parallel zones Z1, Z2, Zi, Zn. The hydronic network 1 includes one or more circuits with fluid transportation lines, e.g. pipes, for transporting a liquid heat transportation medium, e.g. water and/or glycol. As illustrated schematically in FIGS. 1, 2, and 3, each of the zones Z1, Z2, Zi, Zn comprises a regulating valve V1, V2, Vi, Vn for regulating the flow of fluid $\phi1$, $\phi2$, $\phi i$, $\phi n$ through the respective zone Z1, Z2, Zi, Zn. Although not illustrated, in a different configuration, the hydronic network 1 further comprises a bypass line in parallel to the zones Z1, Z2, Zi, Zn. The bypass line comprises a regulating valve for regulating the flow of fluid through the bypass line. It should be noted that the hydronic network 1 shown in FIG. 1 is highly simplified and in actual configurations comprises more than four zones Z1, Z2, Zi, Zn, as indicated schematically in FIGS. 1, 2, and 3 by periods " . . . ".

As shown in FIG. 1, the hydronic network 1 further comprises a common source 13, e.g. a motorized pump 13, e.g. in combination with a heater and/or a chiller.

As illustrated in FIGS. 1, 2, and 3, the hydronic network 1 further includes a common (shared) flow sensor 12, arranged in the main line and configured to measure the total flow of fluid $\phi_{tot}$, e.g. $\phi_{tot}=\phi1+\phi2+\phi i+\phi n$, into all the zones Z1, Z2, Zi, Zn (and the bypass line, if applicable). In an embodiment, the hydronic network 1 includes optionally individual flow sensors arranged in the zones Z1, Z2, Zi, Zn, e.g. with the regulating valves V2, V2, Vi, Vn, for measuring the individual flows of fluid $\phi1$, $\phi2$, $\phi i$, $\phi n$ through the zones Z2, Z2, Zi, Zn or regulating valves V1, V2, Vi, Vn, respectively.

As shown in FIG. 1, the zones Z1, Z2, Zi, Zn further include thermal energy exchangers E1, E2, Ei, En, e.g. a heat exchanger for heating the zone Z1, Z2, Zi, Zn or a cooling device for cooling the zone Z1, Z2, Zi, Zn. Optionally, the hydronic network 1 includes a pressure sensor configured and arranged to measure the (differential) system pressure $\Delta P$ of the hydronic network 1, e.g. the pressure drop over the pump 13 or a thermal energy exchanger E1, E2, Ei, En. In an embodiment, temperature sensors (not illustrated) are arranged in the zones Z1, Z2, Zi, Zn for measuring the supply temperatures T1sup, T2sup, Tisup, Tnsup and return temperatures T1ret, T2ret, Tiret, Tnret in the zones Z1, Z2, Zi, Zn, e.g. the supply temperatures T1sup, T2sup, Tisup, Tnsup of the fluid entering the thermal energy exchangers E1, E2, Ei, En and the return temperatures T1ret, T2ret, Tiret, Tnret of the fluid exiting the thermal energy exchangers E1, E2, Ei, En.

In some embodiments, at least some of the regulating valves V1, V2, Vi, Vn are implemented as six-way valves which are configured to couple a respective zone Z1, Z2, Zi, Zn and its 20 thermal energy exchanger E2, E2, Ei, En alternatively to a first fluid transportation circuit (driven by a first pump 13) for heating or to a second fluid transportation circuit (driven by a second pump 13) for cooling, and to regulate the flow of fluid $\phi1$, $\phi2$, $\phi i$, $\phi n$ from the first or second fluid transportation, respectively, through the zone Z1, Z2, Zi, Zn and its thermal energy exchanger E1, E2, Ei, En. Depending on the current state of coupling set by the six-way valves, the hydronic network 1 actually comprises a first hydraulic sub-network, that comprises the first fluid transportation circuit for heating and the zones Z, Z2, Zi, Zn coupled to the first fluid transportation circuit for heating, and a second hydraulic sub-network, that comprises the second fluid transportation circuit for cooling and the zones Z1, Z2, Zi, Zn coupled to the second fluid transportation circuit for cooling.

As is illustrated schematically in FIGS. 1, 2, and 3, the regulating valves V1, V2, Vi, Vn are driven by (electric) motors M1, M2, Mi, Mn for adjusting the orifice and thus flow of fluid $\phi1$, $\phi2$, $\phi i$, $\phi n$ through the valve V1, V2, Vi, Vn. The motors M1, M2, Mi, Mn are controlled by controllers R1, R2, Ri, Rn that are connected electrically or electromagnetically to the motors M1, M2, Mi, Mn. The controllers R1, R2, Ri, Rn each include an electronic circuit, e.g. a programmable processor, an application specific integrated circuit (ASIC), or another logic unit. For example, a motor M1, M2, Mi, Mn and a controller R1, R2, Ri, Rn form an actuator in a common actuator housing. The actuators or controllers R1, R2, Ri, Rn, respectively, further comprise a communication module configured for wireless and/or wired data communication with an external hydronic network controller 11 and/or a computer system 10. The hydronic network controller 11 comprises one or more programmable processors and a data storage system connected to the processor(s). The computer system 10 comprises one or more operational computers with one or more programmable processors and a data storage system connected to the processor(s). The hydronic network controller 11 and the computer system 10 are configured (programmed) to perform various functions described later in more detail.

As illustrated in FIGS. 2 and 3, depending on configuration end embodiment, the computer system 10 is arranged on-site, as part of the hydronic network 1 environment, e.g. in the same building or premises, or in a remote location, connected to the hydronic network 1 and/or a hydronic network controller 11 via a communications network 2. The communications network 2 includes fixed and/or mobile communications networks, e.g. WLAN (Wireless Local Area Network), GSM (Global System for Mobile Communications), UMTS (Universal Mobile Telephone System), 5G, or other mobile radio networks. In an embodiment, the communications network 2 includes the Internet and the computer system 10 is implemented as a cloud-based computer system.

Figure 4:
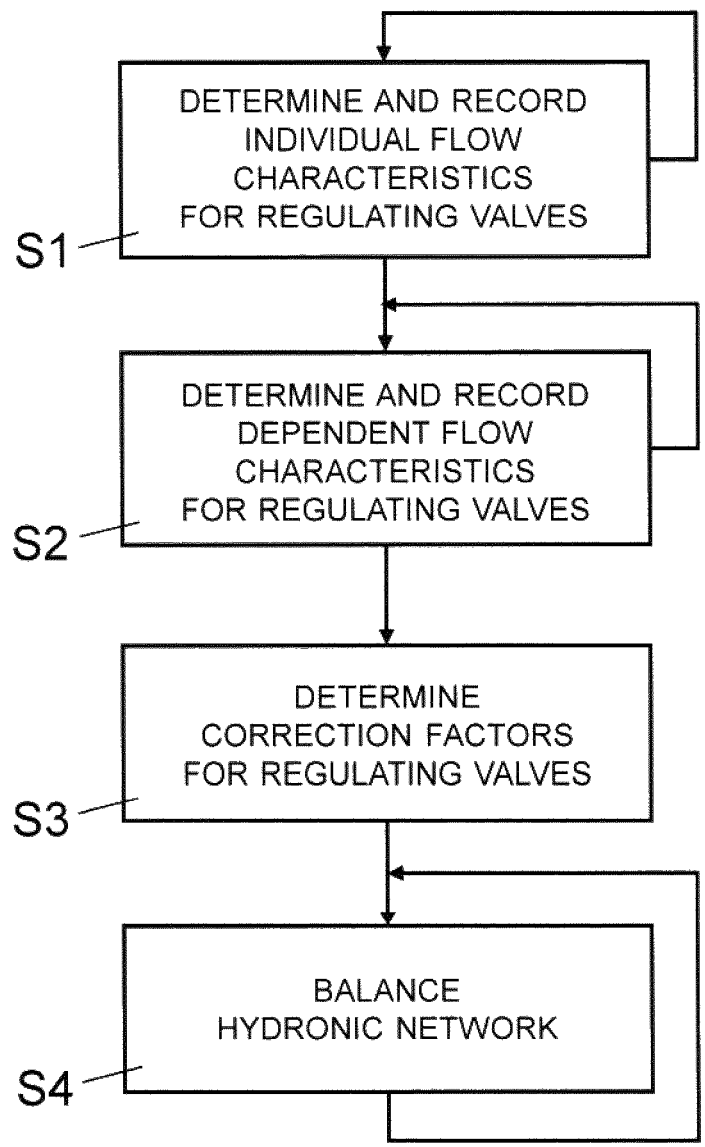
FIG. 4: shows a flow diagram illustrating an exemplary sequence of steps for determining correction factors for the regulating valves of a hydronic network and for balancing the hydronic network.
Figure 5:
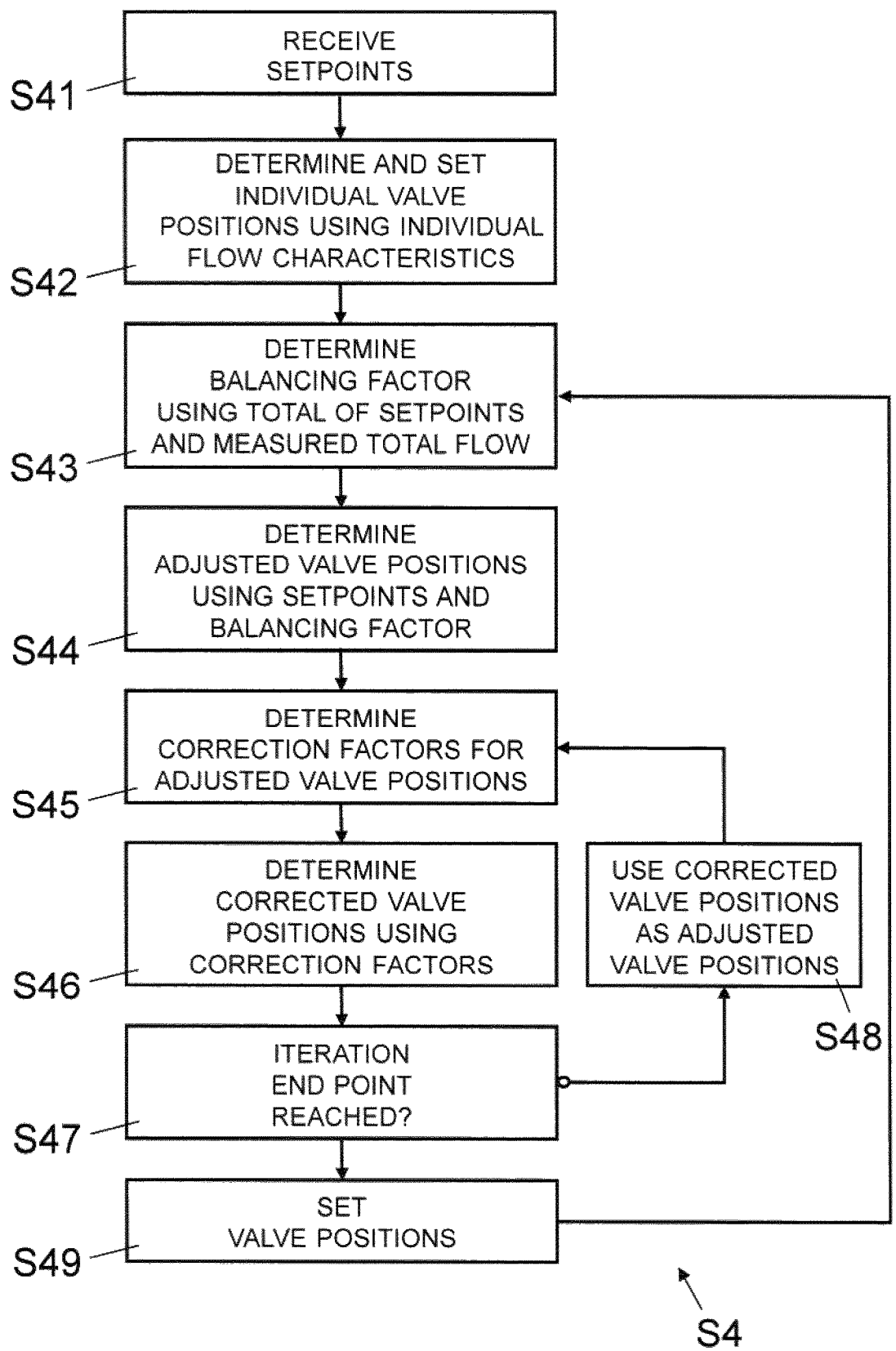
FIG. 5: shows a flow diagram illustrating an exemplary sequence of steps for balancing the hydronic network.

In the following paragraphs, described with reference to FIGS. 4 and 5 are possible sequences of steps performed by the hydronic network controller 11 and/or the computer system 10 for balancing the multi-zone hydronic network 1 or its consumers, i.e. thermal energy exchangers E1, E2, Ei, En, respectively.

It should be pointed out that for hydronic networks 1 that include six-way regulating valves, the characteristic parameters are determined for the first hydraulic sub-network, that comprises the zones Z1, Z2, Zi, Zn coupled to the first fluid transportation circuit for heating, and for the second hydraulic sub-network, that comprises the zones Z1, Z2, Zi, Zn coupled to the second fluid transportation circuit for cooling.

Figure 6:
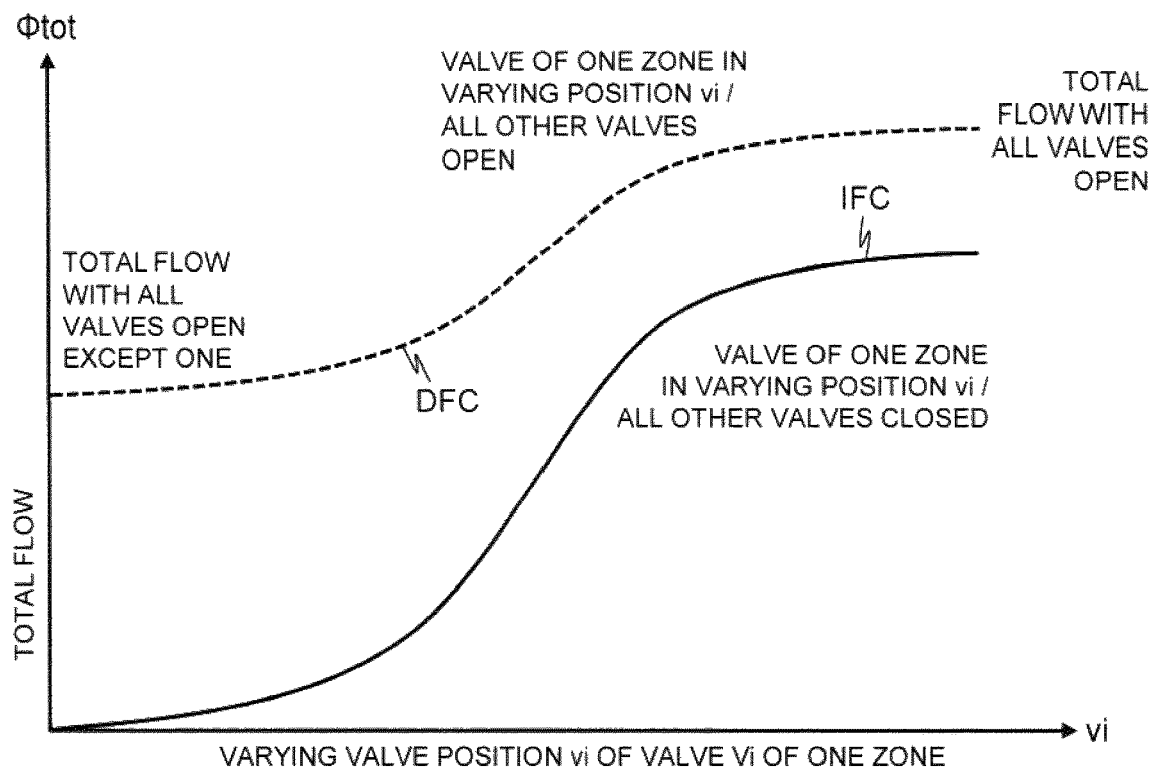
FIG. 6: shows a graph illustrating the total flow measured for a regulating valve at various valve positions, while the other regulating valves of the hydronic network are closed (upper graph) and while the other regulating valves of the hydronic network are open (lower graph).

As illustrated in FIG. 4, in step S1, the computer system 10 determines and records individual flow characteristics IFC for the regulating valves V1, V2, Vi, Vn of the hydronic network 1. More specifically, the computer system 10 determines and records for each of the regulating valves V1, V2, Vi, Vn individual flow characteristics IFC which include, for different valve positions vi of the respective regulating valve Vi, the total flow $\phi_{tot}$ measured by the common flow sensor 22, while the remaining other valves V1, V2, Vn of the hydronic network 1 are set to a closed position, consequently, the measured total flow $\phi_{tot}$ corresponds to the individual flow $\phi i$ through the respective regulating valve Vi and associated zone Zi. FIG. 6 illustrates an example of the individual flow characteristics IFC for a particular valve Vi.

Figure 7:
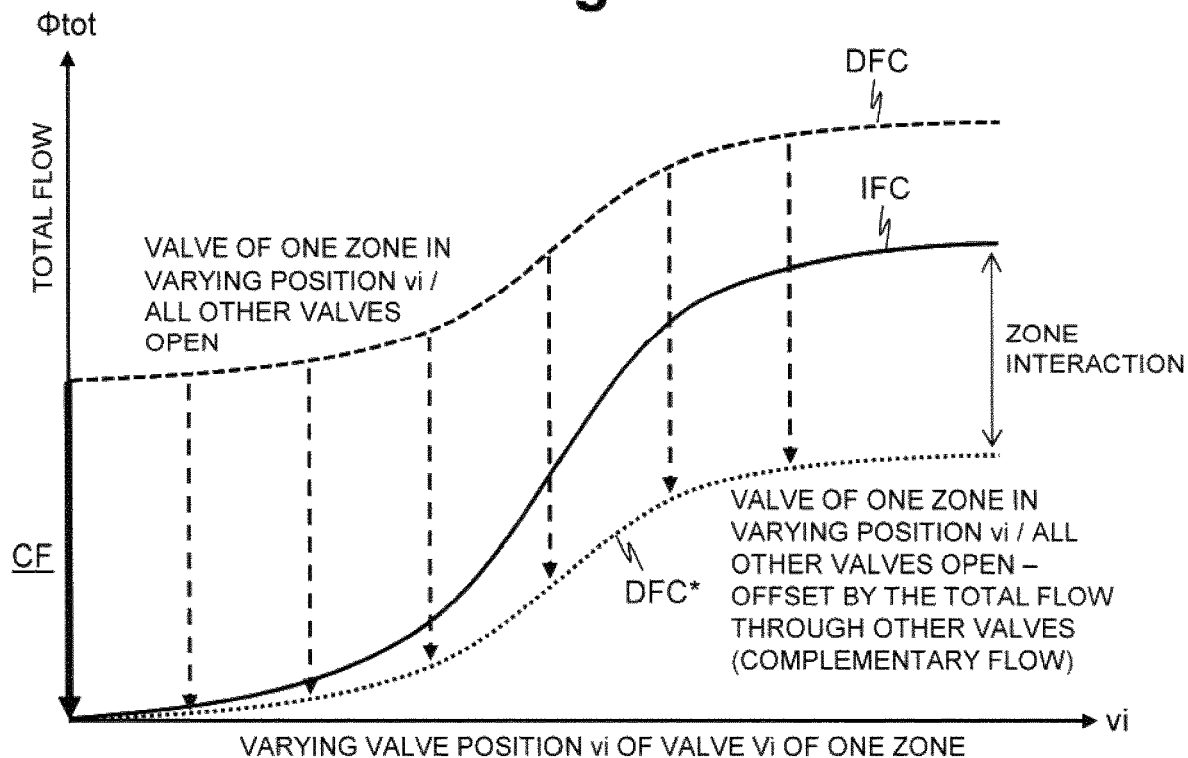
FIGS. 7 and 8: show graphs illustrating a comparison of the total flow, measured for a regulating valve at various valve positions, while the other regulating valves of the hydronic network are closed, with the total flow, measured for the regulating valve at various valve positions, while the other regulating valves of the hydronic network are open.

In step S2, the computer system 10 determines and records combined flow characteristics CFC for the regulating valves V1, V2, Vi, Vn of the hydronic network 1. More specifically, the computer system 10 determines and records for each of the regulating valves V1, V2, Vi, Vn combined flow characteristics CFC which include, for different valve positions vi of the respective regulating valve Vi, the total flow measured by the common flow sensor 22, while the remaining other valves V1, V2, Vn of the hydronic network 1 are set to an open position. In one embodiment, for determining and recording the combined flow characteristics CFC for a regulating valve Vi, the remaining other valves V1, V2, Vn of the hydronic network 1 are (all) set to a fully open position. In an alternative embodiment, the remaining other regulating valves V1, V2, Vn of the hydronic network 1 are set to a plurality of various valve positions, in a range from closed valve position to fully open valve position. FIGS. 6 and 7 illustrate examples of the combined flow characteristics CFC for a particular valve Vi.

In an embodiment, in step S2, the computer system 10 further determines and records for the regulating valves V1, V2, Vi, Vn of the hydronic network 1a "complementary" flow of fluid CF which indicates for the respective regulating valve Vi the total flow of fluid $\Phi$tot measured by the flow sensor 12 at a closed valve position of the respective regulating valve Vi, while the remaining other regulating valves V1, V2, Vn of the hydronic network 1 are set to the open valve position. Essentially, the "complementary" flow of fluid CF indicates the flow of fluid which flows into the remaining other regulating valves V1, V2, Vn of the hydronic network 1 at their respective open positions when the respective regulating valve Vi is set to a closed valve position.

Figure 8:
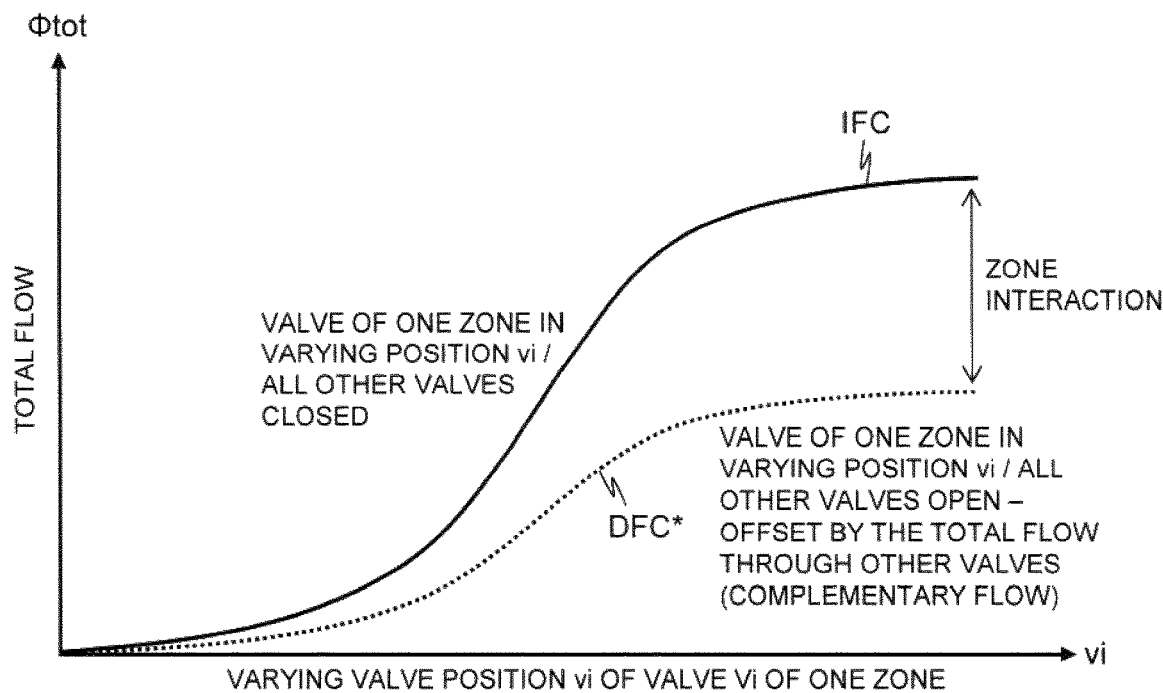
Figure 9:
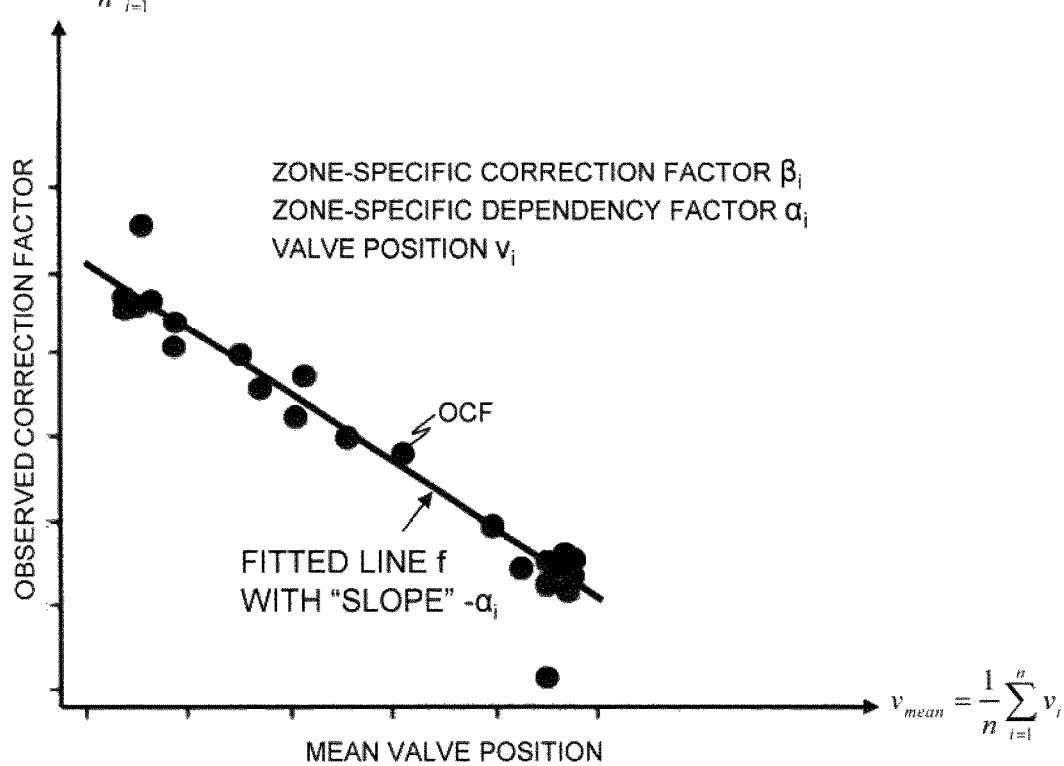
FIG. 9: shows a graph illustrating determined values of a correction factor for a regulating valve at different mean valve positions of the regulating valves of the hydronic network.

FIG. 7 illustrates an example of a complementary flow of fluid CF for a particular regulating valve Vi. FIG. 7 further illustrates the influence of open valve positions of other regulating valves V1, V2, Vn of the hydronic network 1 on the flow of fluid of the respective regulating valve Vi, owing to their interaction/interdependence of shared pipe sections. Specifically, FIG. 7 illustrates dependent flow characteristics DFC of the respective regulating valve Vi determined from the "complementary" flow of fluid CF and the combined flow characteristics CFC of the respective regulating valve Vi, e.g. as a result of subtracting (off-setting) the "complementary" flow of fluid CF from the combined flow characteristics CFC of the respective regulating valve Vi. One skilled in the art will understand that other mathematical operations are possible to determine the dependent flow characteristics DFC from a comparison of the "complementary" flow of fluid CF and the combined flow characteristics CFC of the respective regulating valve Vi. The dependent flow characteristics DFC of the respective regulating valve Vi is also shown in FIG. 8. As indicated in FIGS. 7 and 8, the course of the dependent flow characteristics DFC illustrates clearly the influence of fully open valves V1, V2, Vn on the respective regulating valve Vi because of the zone interaction. As is illustrated in FIG. 9, the zone interaction defines for a particular regulating valve Vi an area of flow characteristics AFC which is determined by the valve's individual flow characteristics IFC, when all other regulating valves V1, V2, Vn of the hydronic network 1 are closed, and the dependent flow characteristics DFC, when all other regulating valves V1, V2, Vn of the hydronic network 1 are fully open (adjusted by the complementary flow of fluid CF). The area of flow characteristics AFC determines the possible flow characteristics of a particular regulating valve Vi depending on the valve positions of the other regulating valves V1, V2, Vn of the hydronic network 1. For example, in FIG. 9, reference numeral DFC* refers to dependent flow characteristics of the particular regulating valve Vi, when the other regulating valves V1, V2, Vn of the hydronic network 1 are set to intermediate positions, e.g. at positions corresponding to valve orifices which are half open (50%).

In step S3, the computer system 10 determines and stores individual correction factors βi for the regulating valves V1, V2, Vi, Vn, using the individual flow characteristics IFC and the combined flow characteristics CFC of the respective regulating valve V1, V2, Vi, Vn. The correction factors βi reflect the influence on the flow of fluid of a respective regulating valve Vi by the other regulating valves V1, V2, Vn of the hydronic network 1 at their respective valve positions v1, v2, vn. Essentially, the individual correction factors βi are determined, such that the flow of fluid $\Phi$i(v1, v2, vi, vn) through a respective regulating valve Vi at given valve positions v1, v2, vi, vn of the regulating valves in the hydronic network 1 corresponds to the individual flow of fluid $\Phi$i(vi) through that respective valve Vi, according to the individual flow characteristics IFC for the respective valve position vi, multiplied ("corrected") by the correction factor βi(v1, v2, vi, vn) at these valve positions v1, v2, vi, vn:

$$\Phi_i(v_1, v_2, v_i, v_n) = \Phi_i(v_i) \cdot \beta_i(v_1, v_2, v_i, v_n)$$

$$\beta_i(v_1, v_2, v_i, v_n) = \frac{\Phi_i(v_1, v_2, v_i, v_n)}{\Phi_i(v_i)}$$

The zone-specific correction factors $\beta_i(v_1, v_2, v_i, v_n)$ are determined iteratively by the computer system 10 applying an objective function to the individual flow characteristics IFC of the regulating valve Vi of the respective zone Zi and the dependent flow characteristics DFC, DFC* of the particular regulating valve Vi.

The objective function for the zone-specific correction factors $\beta_i(v_1, v_2, v_i, v_n)$ is defined as:

$$\frac{\sum_i \Phi_i(v_i) \cdot \beta_i(v_1, v_2, v_i, v_n)}{\sum_i \Phi_i(v_1, v_2, v_i, v_n)} \approx 1$$

whereby $\Phi_i(v_i)$ relates to the individual flow characteristics IFC of the particular regulating valve Vi (flow through the particular regulating valve Vi depending on its respective valve positions vi), and $\Phi_i(v_1, v_2, v_i, v_n)$ relates to the dependent flow characteristics DFC, DFC* of the particular regulating valve Vi (flow through the particular regulating valve Vi depending on the valve positions v1, v2, vi, vn of the regulating valves V1, V2, Vi, Vn). As the sum of the dependent flow characteristics DFC of all zones Z1, Z2, Zi, Zn is equal to the total flow, the denominator can be replaced with the value of the measured total flow $\Phi_{tot\_measured}$, incorporating the measured value into the objective function. The computer system 10 iteratively updates the zone-specific correction factors $\beta_i(v_1, v_2, v_i, v_n)$ to achieve the objective function. The iterative procedure is ended when an iteration end point or convergence criteria is reached, i.e. when the difference to the objective of "1" is minimized. For example, the iterative procedure is ended when the ratio $$\frac{\sum_i \Phi_i(v_i) \cdot \beta_i(v_1, v_2, v_i, v_n)}{\sum_i \Phi_i(v_1, v_2, v_i, v_n)} \text{ or } \frac{\sum_i \Phi_i(v_i) \cdot \beta_i(v_1, v_2, v_i, v_n)}{\Phi_{tot\_measured}},$$

respectively, is within the interval [0.99, 1.01]) for all the observed valve positions v1, v2, vi, vn of the regulating valves V1, V2, Vi, Vn of the hydronic network 1. In essence, the correction factors $\beta_i(v_1, v_2, v_i, v_n)$ are determined by minimizing the objective function which aims at bringing the total flow, predicted based on the correction factors $\beta_i(v_1, v_2, v_i, v_n)$ and the individual flow characteristics IFC, close to the measured total flow $\Phi_{tot\_measured}$, as determined by the dependent flow characteristics DFC, DFC*.

In an embodiment, it is assumed for approximation that the dependence of flow of fluid $\Phi i(vi)$ of a respective regulating valve Vi, at a specific valve position vi, from the valve positions of the regulating valves V1, V2, Vi, Vn of the hydronic network 1, and thus the correction factors $\beta_i(v_1, v_2, v_i, v_n)$, is defined by a linear function of the mean valve position $$v_{mean} = \frac{1}{n}\sum_{j=1}^{n} v_j$$

of the regulating valves V1, V2, Vi, Vn of the hydronic network 1. Accordingly, the correction factors βi for the regulating valves V1, V2, Vi, Vn can be defined using a zone-specific dependency factor αi:

$$\beta_i(v_1, v_2, v_i, v_n) \approx 1 - \alpha_i \cdot v_{mean} = 1 - \alpha_i \frac{1}{n}\sum_{j=1}^{n} v_j$$

The practical applicability of this linear approximation is shown in FIG. 9. Specifically, FIG. 9 shows a graph illustrating determined values DCFs (DCF, DCF*, DCF**) of (zone-specific) correction factors βi for a respective regulating valve Vi at different mean valve positions $$v_{mean} = \frac{1}{n}\sum_{j=1}^{n} v_j$$

of the regulating valves V1, V2, Vi, Vn in the hydronic network 1, whereby αi is defined by the "slope" of the fitted line f through the determined values DCFs (DCF, DCF*, DCF**) of (zone-specific) correction factors βi. Specifically, in FIG. 9, reference numeral DCF refers to the determined correction factor βi of a particular zone Zi or regulating valve Vi, respectively, being close to "1", for the scenario when all the remaining other regulating valves V1, V2, Vn of the hydronic network 1 are set to a closed position and the particular regulating valve Vi performs in accordance with its individual flow characteristics IFC. Reference numeral DCF* refers to the determined correction factor βi of a particular zone Zi or regulating valve Vi, respectively, for the scenario when all the remaining other regulating valves V1, V2, Vn of the hydronic network 1 are set to fully open position and the particular regulating valve Vi performs in accordance with its (offset) dependent flow characteristics DFC*. Reference numeral DCF refers to the determined correction factor βi of a particular zone Zi or regulating valve Vi, respectively, for the scenario when the remaining other regulating valves V1, V2, Vn of the hydronic network 1 are set to an intermediate position and the particular regulating valve Vi performs in accordance with its respective dependent flow characteristics DFC, depicted in FIG. 8. More specifically, the zone-specific dependency factors Wi are determined iteratively, by the computer system 10 applying an objective function to the individual flow characteristics IFC of the regulating valve Vi of the respective zone Zi and the combined flow characteristics CFC of the particular regulating valve Vi at the valve positions v1, v2, vi, vn of the regulating valves V1, V2, Vi, Vn of the hydronic network 1.

The objective function for the zone-specific dependency factors $\alpha_i$ is defined as:

$$\frac{\sum_i \Phi_i(v_i) \cdot \left(1 - \alpha_i \frac{1}{n}\sum_{j=1}^{n} v_j\right)}{\Phi_{tot\_measured}} \approx 1$$

whereby $\Phi_i(v_i)$ relates to the individual flow characteristics IFC of the particular regulating valve Vi, and $\Phi_{tot\_measured}$ relates to the total flow measured for the valve positions v1, v2, vi, vn of the regulating valves V1, V2, Vi, Vn as defined by the combined flow characteristics CFC of the particular regulating valve Vi at the valve positions v1, v2, vi, vn of the regulating valves V1, V2, Vi, Vn of the hydronic network 1. The computer system 10 iteratively updates the zone-specific dependency factors $\alpha_i$ to achieve the objective function. The iterative procedure is ended when an iteration end point or convergence criteria is reached, i.e. when the difference to the objective of "1" is minimized. For example, the iterative procedure is ended when the ratio $$\frac{\sum_i \Phi_i(v_i) \cdot \left(1 - \alpha_i \frac{1}{n}\sum_{j=1}^{n} v_j\right)}{\Phi_{tot\_measured}}$$

is within the interval [0.99, 1.01]) for all the observed valve positions v1, v2, vi, vn of the regulating valves V1, V2, Vi, Vn of the hydronic network 1. In essence, the zone-specific dependency factors $\alpha_i$ are determined by minimizing the objective function which aims at bringing the total flow, predicted based on the dependency factors $\alpha_i$, the mean valve position $$v_{mean} = \frac{1}{n}\sum_{j=1}^{n} v_j$$

and the individual flow characteristics IFC, close to the measured total flow $\Phi_{tot\_measured}$.

One skilled in the art will understand that the more complex (higher order) functions or can be used to define or approximate the zone-specific dependency or correction factors βi, respectively.

In step S4, the computer system 10 and/or the hydronic network controller 11, use the zone-specific correction factors βi or dependency factors αi for balancing the multi-zone hydronic network 1 or its consumers, respectively.

As illustrated in FIG. 5, in step S41, the computer system 10 and/or the hydronic network controller 11, respectively, receives setpoints si for the flow of fluid Φi for the regulating valves V1, V2, Vi, Vn of the hydronic network 1.

In an embodiment, in step S41, the computer system 10 and/or the hydronic network controller 11, respectively, receives setpoints for thermal energy to be transferred or exchanged in the zone(s) Z1, Z2, Zi, Zn by the respective thermal energy exchangers E1, E2, Ei, En, and determines the setpoints si for the flow of fluid Φi for the regulating valves V1, V2, Vi, Vn, using the thermal energy transfer setpoints si. More specifically, the computer system 10 and/or the hydronic network controller 11, respectively, determines the setpoints si using the thermal energy transfer setpoints and the current thermal energy transfer rates of the thermal energy exchangers E1, E2, Ei, En. The computer system 10 and/or the hydronic network controller 11, respectively, determines the current thermal energy transfer rates $R_i = \Phi_i \cdot \Delta T = \Phi_i (T_{isup} - T_{iret})$ of the thermal energy exchangers E1, E2, Ei, En using the measured supply and return temperatures T1sup, T2sup, Tisup, Tnsup, T1ret, T2ret, Tiret, Tnret in the zones Z1, Z2, Zi, Zn, and the flow rates flow φ1, φ2, φi, φn through the valves V1, V2, Vi, Vn of the respective zones Z1, Z2, Zi, Zn. Accordingly, this embodiment enables a method of controlling and balancing the energy transfer in the multi-zone hydronic network 1.

In step S42, the computer system 10 and/or the hydronic network controller 11, respectively, determines and sets individual valve positions v1, v2, vi, vn for the regulating valves V1, V2, Vi, Vn, for the individual setpoints si, using the individual flow characteristics IFC of the regulating valves V1, V2, Vi, Vn.

In step S43, the computer system 10 and/or the hydronic network controller 11, respectively, determines a balancing factor b, using the total of the expected flow of fluid Φi through all the regulating valves V1, V2, Vi, Vn at their respective individual valve positions v1, v2, vi, vn, and the total flow of fluid $\Phi_{tot\_measured}$, for the regulating valves V1, V2, Vi, Vn set to their individual valve positions v1, v2, vi, vn (and the zone-specific correction factors $\beta_i$ once they are determined):

$$b = \frac{\sum_i \Phi_i(v_i) \cdot \beta_i}{\Phi_{tot\_measured}}$$

In step S44, the computer system 10 and/or the hydronic network controller 22, respectively, determines adjusted valve positions v1, v2, vi, vn for the regulating valves V1, V2, Vi, Vn, using the balancing factor b. Specifically, the setpoints si are scaled by the balancing factor b, and the adjusted valve positions v1, v2, vi, vn are determined for the scaled setpoints si, using initially the individual flow characteristics IFC of the regulating valves V2, V2, Vi, Vn:

$$\Phi_i(v_i) = s_i \cdot b$$

In step S45, the computer system 10 and/or the hydronic network controller 11, respectively, determines the zone-specific correction factors βi or dependency factors αi, using the adjusted valve positions v1, v2, vi, vn. Specifically, using the linear approximation approach, the zone-specific correction factors βi are determined for the adjusted valve positions v1, v2, vi, vn, e.g. using the dependency factors αi stored for the zones Z1, Z2, Zi, Zn or regulating valve V1, V2, Vi, Vn respectively:

$$\beta_i(v_1, v_2, v_i, v_n) \approx 1 - \alpha_i \frac{1}{n}\sum_{j=1}^{n} v_j$$

In step S46, the computer system 10 and/or the hydronic network controller 11, respectively, determines corrected valve positions v1, v2, vi, vn for the regulating valves V2, V2, Vi, Vn, to reflect the mutual influences of the regulating valves V1, V2, Vi, Vn or zones Z1, Z2, Zi, Zn of the hydronic network 1, using the zone-specific correction factors βi and/or dependency factors αi, respectively. Specifically, the setpoints si scaled by the balancing factor b are further scaled or corrected by the zone-specific correction factors βi and/or dependency factors αi, respectively, and the corrected valve positions v1, v2, vi, vn are determined for the scaled and corrected setpoints si, using the individual flow characteristics IFC of the regulating valves V1, V2, Vi, Vn:

$$\Phi_i(v_i) = s_i \frac{b}{\beta_i(v_1, v_2, v_i, v_n)} \approx s_i \frac{b}{1 - \alpha_i \frac{1}{n}\sum_{j=1}^{n} v_j}$$

In step S47, the computer system 10 and/or the hydronic network controller 11, respectively, determines whether or not the iteration end point for has been reached for the iterative determination of the corrected valve positions v1, v2, vi, vn for the regulating valves V2, V2, Vi, Vn. In an embodiment, the iteration endpoint is defined as a change threshold which defines a minimum ratio or percentage of change of the valve positions v1, v2, vi, vn in an iteration cycle for the iteration to continue. For example, the change threshold is set to 1%, 2% or 5%. If the total ratio of change of the valve positions v1, v2, vi, vn in an iteration cycle is below the change threshold, the iteration end point is reached. Alternatively or in combination, the iteration end point is reached when a maximum number of performed iteration cycles has been reached. For example, the maximum number of iteration cycles is set to 20, 20, 50 or 100.

If the iteration end point has not been reached yet, the computer system 10 and/or the hydronic network controller 11, respectively, continues the iteration process in step S48, using the corrected valve positions v1, v2, vi, vn of step S46 for determining refined zone-specific correction factors βi and/or dependency factors αi and further refined corrected valve positions v1, v2, vi, vn in steps S45 and S46.

Otherwise, if the iteration end point has been reached, in step S49, the computer system 10 and/or the hydronic network controller 11, respectively, sets the valve positions v1, v2, vi, vn for the regulating valves V1, V2, Vi, Vn, using the corrected valve positions v1, v2, vi, vn of step S46.

Dynamic and iterative balancing continues in step S43, by the computer system 10 and/or the hydronic network controller 11, respectively, determining the current balancing factor b, using the total of the setpoints si for the regulating valves V1, V2, Vi, Vn and the current total flow of fluid $\Phi_{tot\_measured}$, measured for the regulating valves V1, V2, Vi, Vn set to their corrected valve positions v1, v2, vi, vn.

At this point it should be noted that in the embodiment where the hydronic network 1 comprises individual flow sensors arranged in the zones Z1, Z2, Zi, Zn for measuring the individual flows of fluid φ1, φ2, φi, φn through the zones Z1, Z2, Zi, Zn or regulating valves V1, V2, Vi, Vn, respectively, the computer system 10 uses the individual flows of fluid φ1, φ2, φi, φn measured by the individual flow sensors for determining the individual flow characteristics IFC of the respective regulating valves V1, V2, Vi, Vn and the combined flow characteristics CFC of the respective regulating valves V1, V2, Vi, Vn, thereby reducing computation and iteration cycles.

It should be further noted that in the embodiment where the hydronic network 1 includes a pressure sensor configured and arranged to measure the (differential) system pressure ΔP of the hydronic network 1, the measured (individual and total) flow values are scaled by the current pressure value ($\Phi \approx \sqrt{\Delta p}$).

It should be noted that, in the description, the computer program code has been associated with specific processors and the sequence of the steps has been presented in a specific order, one skilled in the art will understand, however, that the computer program code may be structured differently and that the order of at least some of the steps could be altered, without deviating from the scope of the invention. For example, one skilled in the art will understand that at least some of the functions and operations described above can be implemented and performed on the computer system 10, the hydronic network controller 22, and/or one or more of the controllers R1, R2, Ri, Rn.

The invention claimed is:

1. A method of balancing a hydronic network (1) that comprises a plurality of parallel zones (Z1, Z2, Zi, Zn) with a regulating valve (V1, V2, Vi, Vn) in each zone (Z1, Z2, Zi, Zn) for regulating a flow of fluid (Φ1, Φ2, ΦI, ΦN, Φi, Φn) through the respective zone (Z1, Z2, Zi, Zn), the method comprising:

using one flow sensor (12) to measure a total flow of fluid (Φtot) through the plurality of parallel zones (Z1, Z2, Zi, Zn) of the hydronic network (1); and recording (S1) in a computer (10) for each of the regulating valves (V1, V2, Vi, Vn) individual flow characteristics (IFC), the individual flow characteristics indicating for a respective regulating valve (V1, V2, Vi, Vn) the total flow of fluid (Φtot) measured by the flow sensor (12) at different valve positions of the respective regulating valve (V1, V2, Vi, Vn), while the remaining other regulating valves of the hydronic network (1) are set to a closed valve position;

wherein the method further comprises:

recording (S2) in the computer (10) for each of the regulating valves (V1, V2, Vi, Vn) combined flow characteristics (CFC), the combined flow characteristics (CFC) indicating for the respective regulating valve (V1, V2, Vi, Vn) the total flow of fluid (Φtot) measured by the flow sensor (12) at different valve positions of the respective regulating valve (V1, V2, Vi, Vn), while the remaining other regulating valves (V1, V2, Vi, Vn) of the hydronic network (1) are set to an open valve position;

determining (S3) by the computer (10) correction factors (βi) for each of the regulating valves (V1, V2, Vi, Vn), using the individual flow characteristics (IFC) of the respective regulating valve (V1, V2, Vi, Vn) and the combined flow characteristics (CFC) of the respective regulating valve (V1, V2, Vi, Vn); and balancing (S4) the hydronic network (1) by the computer (10) setting the valve positions of the regulating valves (V1, V2, Vi, Vn), using target flows (S1, S2, Si, Sn) for the zones (Z1, Z2, Zi, Zn) and the correction factors (βi) of the regulating valves (V1, V2, Vi, Vn).

2. The method of claim 1, wherein balancing (S4) the hydronic network (1) comprises the computer (10) determining (S42) individual valve positions for the regulating valves (V1, V2, Vi, Vn), using the target flows (S1, S2, Si, Sn) for the zones (Z1, Z2, Zi, Zn) and the individual flow characteristics (IFC) of the regulating valves (V1, V2, Vi, Vn), and determining (S3) the correction factors (βi) for each of the regulating valves (V1, V2, Vi, Vn) further using the individual valve positions of the regulating valves (V1, V2, Vi, Vn).

3. The method of claim 1, wherein balancing (S4) the hydronic network (1) comprises the computer (10) performing an iteration process which includes determining (S45) in a first step correction factors (βi) for the regulating valves (V1, V2, Vi, Vn), using individual valve positions for the regulating valves (V1, V2, Vi, Vn), determining (S46) in a second step corrected valve positions for the regulating valves (V1, V2, Vi, Vn), using the target flows (S1, S2, Si, Sn) for the zones (Z1, Z2, Zi, Zn) and the correction factors (βi) of the regulating valves (V1, V2, Vi, Vn), and repeating the first step and the second step, using (S48) the corrected valve positions from the second step as the individual valve positions in the first step.

4. The method of claim 3, wherein performing the iteration process comprises the computer (10) using the corrected valve positions for determining (S47) whether an iteration end point is reached, prior to the repeating of the first step and the second step.

5. The method of claim 1, wherein recording (S2) the combined flow characteristics (CFC) comprises the computer (10) recording for each of the regulating valves (V1, V2, Vi, Vn) the total flow of fluid (Φtot) measured by the flow sensor (12) at different valve positions of the respective regulating valve (V1, V2, Vi, Vn) and at various valve positions of the remaining other regulating valves (V1, V2, Vi, Vn) of the hydronic network (1), in a range from closed valve position to fully open valve position; and determining (S3) the correction factors (βi) comprises the computer (10) determining (S3) correction factors (βi) for each of the regulating valves (V1, V2, Vi, Vn) for a plurality of different valve positions of the regulating valves (V1, V2, Vi, Vn) of the hydronic network (1).

6. The method of claim 1, wherein the method further comprises recording (S2) in the computer (10) for each of the regulating valves (V1, V2, Vi, Vn) a complementary flow of fluid (CF), the complementary flow of fluid (CF) indicating for the respective regulating valve (V1, V2, Vi, Vn) the total flow of fluid (Φtot) measured by the flow sensor (12) at a closed valve position of the respective regulating valve (V1, V2, Vi, Vn), while the remaining other regulating valves (V1, V2, Vi, Vn) of the hydronic network (1) are set to the open valve position; and determining (S3) the correction factors (βi) comprises the computer (10) using the complementary flow of fluid (CF) of the respective regulating valve (V1, V2, Vi, Vn) and the combined flow characteristics (CFC) of the respective regulating valve (V1, V2, Vi, Vn).

7. The method of claim 1, wherein the method further comprises the computer (10) computing dependent flow characteristics (DFC) for each of the regulating valves (V1, V2, Vi, Vn), using the combined flow characteristics (CFC) of the respective regulating valve (V1, V2, Vi, Vn) and the total flow of fluid (Φtot) measured by the flow sensor (12) at a closed valve position of the respective regulating valve (V1, V2, Vi, Vn), while the remaining other regulating valves (V1, V2, Vi, Vn) of the hydronic network (1) are set to the open valve positions; and the computer (10) determining the correction factors (βi) for each of the regulating valves (V1, V2, Vi, Vn) by applying an objective function to the dependent flow characteristics (DFC) of the respective regulating valve (V1, V2, Vi, Vn) and the individual flow characteristics (IFC) of the respective regulating valve (V1, V2, Vi, Vn).

8. The method of one of claim 1, wherein determining (S3) the correction factors (βi) comprises the computer (10) calculating a mean valve position from the valve positions of the regulating valves (V1, V2, Vi, Vn) of the hydronic network (1), and determining the correction factor (βi) for the respective regulating valve (V1, V2, Vi, Vn) of a particular zone (Z1, Z2, Zi, Zn) using the mean valve position and a zone-specific dependency factor (αi) of the particular zone (Z1, Z2, Zi, Zn).

9. The method of claim 1, wherein the method further comprises using a pressure sensor to measure a current system pressure (Δp) of the hydronic network (1); and the computer (10) scaling the total flow of fluid (Φtot) measured by the flow sensor (12), using the current system pressure.

10. The method of claim 1, wherein the method further comprises using one or more individual flow sensors to measure individual flows of fluid (Φ1, Φ2, ΦI, ΦN, Φi, Φn) through respective regulating valves (V1, V2, Vi, Vn); and the computer (10) using the individual flows of fluid (Φ1, Φ2, Φ, Φn) measured by the individual flow sensors for determining the individual flow characteristics (IFC) of the respective regulating valves (V1, V2, Vi, Vn) and the combined flow characteristics (CFC) of the respective regulating valves (V1, V2, Vi, Vn).

11. A computer system (10) for balancing a hydronic network (1) that comprises a plurality of parallel zones (Z1, Z2, Zi, Zn) with a regulating valve (V1, V2, Vi, Vn) in each zone (Z1, Z2, Zi, Zn) for regulating a flow of fluid (Φ1, Φ2, Φi, Φn) through the respective zone (Z1, Z2, Zi, Zn), and a flow sensor (12) for measuring a total flow of fluid (Φtot) through the plurality of parallel zones (Z1, Z2, Zi, Zn) of the hydronic network (1), the computer system (10) comprising a processor configured to:
receive from the flow sensor (12) the total flow of fluid (Φtot) through the plurality of parallel zones (Z1, Z2, Zi, Zn); and
record (Si) for each of the regulating valves (V1, V2, Vi, Vn) individual flow characteristics (IFC), the individual flow characteristics indicating for a respective regulating valve (V1, V2, Vi, Vn) the total flow of fluid (Φtot) measured by the flow sensor (12) at different valve positions of the respective regulating valve (V1, V2, Vi, Vn), while the remaining other regulating valves of the hydronic network (1) are set to a closed valve position;

wherein the processor is further configured to:
record (S2) for each of the regulating valves (V1, V2, Vi, Vn) combined flow characteristics (CFC), the combined flow characteristics (CFC) indicating for the respective regulating valve (V1, V2, Vi, Vn) the total flow of fluid (Φtot) measured by the flow sensor (12) at different valve positions of the respective regulating valve (V1, V2, Vi, Vn), while the remaining other regulating valves (V1, V2, Vi, Vn) of the hydronic network (1) are set to an open valve position;
determine (S3) correction factors (βi) for each of the regulating valves (V1, V2, Vi, Vn), using the individual flow characteristics (IFC) of the respective regulating valve (V1, V2, Vi, Vn) and the combined flow characteristics (CFC) of the respective regulating valve (V1, V2, Vi, Vn); and
balance (S4) the hydronic network (1) by setting the valve positions of the regulating valves (V1, V2, Vi, Vn), using target flows (S1, S2, Si, Sn) for the zones (Z1, Z2, Zi, Zn) and the correction factors (βi) of the regulating valves (V1, V2, Vi, Vn).

12. The computer system (10) of claim 11, wherein the processor is configured to balance (S4) the hydronic network (1) by determining individual valve positions for the regulating valves (V1, V2, Vi, Vn), using the target flows (S1, S2, Si, Sn) for the zones (Z1, Z2, Zi, Zn) and the individual flow characteristics (IFC) of the regulating valves (V1, V2, Vi, Vn), and determining (S3) the correction factors (βi) for each of the regulating valves (V1, V2, Vi, Vn) further using the individual valve positions of the regulating valves (V1, V2, Vi, Vn).

13. The computer system (10) of claim 11, wherein the processor is configured to balance (S4) the hydronic network (1) by performing an iteration process which includes determining in a first step correction factors (βi) for the regulating valves (V1, V2, Vi, Vn), using individual valve positions for the regulating valves (V1, V2, Vi, Vn), determining in a second step corrected valve positions for the regulating valves (V1, V2, Vi, Vn), using the target flows (S1, S2, Si, Sn) for the zones (Z1, Z2, Zi, Zn) and the correction factors (βi) of the regulating valves (V1, V2, Vi, Vn), and repeating the first step and the second step, using the corrected valve positions from the second step as the individual valve positions in the first step.

14. The computer system (10) of claim 13, wherein the processor is configured to perform the iteration process using the corrected valve positions for determining whether an iteration end point is reached, prior to the repeating of the first step and the second step.

15. The computer system (10) of claim 11, wherein the processor is configured to record (S2) the combined flow characteristics (CFC) by recording for each of the regulating valves (V1, V2, Vi, Vn) the total flow of fluid (Φtot) measured by the flow sensor (12) at different valve positions of the respective regulating valve (V1, V2, Vi, Vn) and at various valve positions of the remaining other regulating valves (V1, V2, Vi, Vn) of the hydronic network (1), in a range from closed valve position to fully open valve position; and determine (S3) the correction factors (βi) for each of the regulating valves (V1, V2, Vi, Vn) for a plurality of different valve positions of the regulating valves (V1, V2, Vi, Vn) of the hydronic network (1).

16. The computer system (10) of claim 11, wherein the processor is configured to record (S2) for each of the regulating valves (V1, V2, Vi, Vn) a complementary flow of fluid (CF), the complementary flow of fluid (CF) indicating for the respective regulating valve (V1, V2, Vi, Vn) the total flow of fluid (Φtot) measured by the flow sensor (12) at a closed valve position of the respective regulating valve (V1, V2, Vi, Vn), while the remaining other regulating valves (V1, V2, Vi, Vn) of the hydronic network (1) are set to the open valve position; and determine (S3) the correction factors (βi) using the complementary flow of fluid (CF) of the respective regulating valve (V1, V2, Vi, Vn) and the combined flow characteristics (CFC) of the respective regulating valve (V1, V2, Vi, Vn).

17. The computer system (10) of claim 11, wherein the processor is further configured to compute dependent flow characteristics (DFC) for each of the regulating valves (V1, V2, Vi, Vn), using the combined flow characteristics (CFC) of the respective regulating valve (V1, V2, Vi, Vn) and the total flow of fluid (Φtot) measured by the flow sensor (12) at a closed valve position of the respective regulating valve (V1, V2, Vi, Vn), while the remaining other regulating valves (V1, V2, Vi, Vn) of the hydronic network (1) are set to the open valve positions; and to determine (S3) the correction factors (βi) for each of the regulating valves (V1, V2, Vi, Vn) by applying an objective function to the dependent flow characteristics (DFC) of the respective regulating valve (V1, V2, Vi, Vn) and the individual flow characteristics (IFC) of the respective regulating valve (V1, V2, Vi, Vn).

18. The computer system (10) of claim 11, wherein the processor is configured to determine (S3) the correction factors (βi) by calculating a mean valve position from the valve positions of the regulating valves (V1, V2, Vi, Vn) of the hydronic network (1), and determining the correction factor (βi) for the respective regulating valve (V1, V2, Vi, Vn) of a particular zone (Z1, Z2, Zi, Zn) using the mean valve position and a zone-specific dependency factor (αi) of the particular zone (Z1, Z2, Zi, Zn).

19. The computer system (10) of claim 11, wherein the processor is configured to receive from a pressure sensor a current system pressure (Δp) of the hydronic network (1); and to scale the total flow of fluid (Φtot) measured by the flow sensor (12), using the current system pressure.

20. The computer system (10) of claim 11, the processor is configured to receive from one or more individual flow sensors individual flows of fluid (Φ1, Φ2, Φ, Φn) through respective regulating valves (V1, V2, Vi, Vn); and to use the individual flows of fluid (Φ1, Φ2, Φ, Φn) from the individual flow sensors for determining the individual flow characteristics (IFC) of the respective regulating valves (V1, V2, Vi, Vn) and the combined flow characteristics (CFC) of the respective regulating valves (V1, V2, Vi, Vn).

21. A computer program product comprising a non-transitory computer-readable medium having stored thereon computer program code configured to control one or more processors of a computer system (10) for balancing a hydronic network (1) that comprises a plurality of parallel zones (Z1, Z2, Zi, Zn) with a regulating valve (V1, V2, Vi, Vn) in each zone (Z1, Z2, Zi, Zn) for regulating a flow of fluid (Φ1, Φ2, Φi, Φn) through the respective zone (Z1, Z2, Zi, Zn), and a flow sensor (12) for measuring a total flow of fluid (Φtot) through the plurality of parallel zones (Z1, Z2, Zi, Zn) of the hydronic network (1), such that the computer system (10):
  receives from the flow sensor (12) the total flow of fluid (Φtot) through the plurality of parallel zones (Z1, Z2, Zi, Zn); and
  records (S1) for each of the regulating valves (V1, V2, Vi, Vn) individual flow characteristics (IFC), the individual flow characteristics indicating for a respective regulating valve (V1, V2, Vi, Vn) the total flow of fluid (Φtot) measured by the flow sensor (12) at different valve positions of the respective regulating valve (V1, V2, Vi, Vn), while the remaining other regulating valves of the hydronic network (1) are set to a closed valve position;
wherein the computer program code is further configured to control the one or more processors of the computer system (10) such that the computer system (10):
records (S2) for each of the regulating valves (V1, V2, Vi, Vn) combined flow characteristics (CFC), the combined flow characteristics (CFC) indicating for the respective regulating valve (V1, V2, Vi, Vn) the total flow of fluid (Φtot) measured by the flow sensor (12) at different valve positions of the respective regulating valve (V1, V2, Vi, Vn), while the remaining other regulating valves (V1, V2, Vi, Vn) of the hydronic network (1) are set to an open valve position;
determines (S3) correction factors (βi) for each of the regulating valves (V1, V2, Vi, Vn), using the individual flow characteristics (IFC) of the respective regulating valve (V1, V2, Vi, Vn) and the combined flow characteristics (CFC) of the respective regulating valve (V1, V2, Vi, Vn); and
balances (S4) the hydronic network (1) by setting the valve positions of the regulating valves (V1, V2, Vi, Vn), using target flows (S1, S2, Si, Sn) for the zones (Z1, Z2, Zi, Zn) and the correction factors (βi) of the regulating valves (V1, V2, Vi, Vn).

* * * * *